UNITED STATES PATENT OFFICE.

HERBERT C. RYDING AND ANSON W. ALLEN, OF BIRMINGHAM, ALABAMA.

MANUFACTURE OF OPEN-HEARTH STEEL.

1,289,057.   Specification of Letters Patent.   Patented Dec. 24, 1918.

No Drawing.   Application filed July 6, 1917.   Serial No. 178,930.

*To all whom it may concern:*

Be it known that we, HERBERT C. RYDING and ANSON W. ALLEN, citizens of the United States, residing in Birmingham, Alabama, have invented certain new and useful Improvements in the Manufacture of Open-Hearth Steel, of which the following is a specification.

This invention aims to provide an improved process of manufacturing steel in basic open hearth furnaces using all blown metal for the charge, whereas previously a substantial quantity of steel scrap has generally been charged with the lime and iron oxid before the addition of the blown metal to the furnace. This process of using all blown metal works very economically and rapidly and produces a fine quality of steel.

The charge is made up of blown metal and slag-forming materials, usually lime, iron oxid and manganese ore. The blown metal is taken from the converter in any number of successive ladles. First, there are taken several ladles of metal blown low in carbon and finally a ladle, or ladles, of metal blown high in carbon. For example, when five ladles constitute this full charge, the first four ladles may be blown down to about 0.06 per cent. carbon and the fifth ladle of metal blown only down to about 2.50 to 3.00 per cent. carbon. The charge of blown metal is thus secured of a desired intermediate carbon percentage which is difficult to secure with the same exactness in the Bessemer operations. The Bessemer operation is so fast that it is difficult to stop it at a definite carbon percentage between the limits stated. There are noticeable changes in the condition, however, when the carbon has been blown to 2.50 to 3.00 per cent. and there is another noticeable change when it is blown down to about 0.06 per cent. By combining successive ladles as described, therefore, the Bessemer operations are made easy and the successive ladles for the open hearth can be produced exactly as required.

Where the slag-forming materials are introduced first and the blown metal afterward we have found that the bottom of the furnace builds up by the lime sticking to it, to a point where such a use of the furnace cannot be continued. We have found, however, that this difficulty can be corrected by reversing the order of introduction of the blown metal and the slag-forming materials. We, therefore, use two alternating operations, one serving to build up the bottom and the other to erode it. We alternate these operations as required and thus maintain a bottom which is sufficiently uniform for all practical purposes. It is not necessary to shift from one operation to the other for each successive bath of metal. We may use one operation until the bottom is too far built up or too far eroded and then use the other until the opposite condition is obtained, and so on. A specific example is as follows:

After completing repairs to the bottom of the furnace which are usual before charging, we introduce the necessary quantity of lime on the bottom and the necessary quantity of iron oxid and manganese ore on top of the lime. We introduce immediately after the introduction of the slag materials referred to four ladles of converter metal averaging about 45,000 pounds each, this metal being of soft steel quality, having the silicon and manganese blown out and the carbon reduced to about 0.06 per cent. The bath is then heated for one and a half to two hours, until the bath and slag are in proper condition. A fifth ladle of high carbon blown metal is then added, the carbon being from 2.50 to 3.00 per cent.

The carbon in the last ladle combines very rapidly with the oxygen in the bath and in the slag and sets up a violent agitation, during which the phosphorus in the metal is rapidly oxidized and passes from the bath into the slag; the purification of the metal being facilitated by the heating effect of the oxidation of the phosphorus and of the combustion of the gas in the furnace.

These reactions are allowed to continue until the bath is brought to the desired composition and temperature for tapping or pouring. Before tapping we have found it advisable to add about 1,000 pounds of cold pig iron for the purpose of correcting any over oxidized condition of the bath and to secure a desired carbon content therein. The time required to add the last ladle of metal from the converter and to finish the heat ready for tapping is about two or two and a half hours.

In tapping we may add coke dust for recarburization and ferro-manganese and ferro-silicon according to the requirements of the specification. The furnace is completely drained of both steel and slag, completing the cycle of one operation, and repairs are then made to the banks and bottom of the furnace as far as may be necessary before the next heat.

After these repairs are made, and supposing the above operations have been repeated to such an extent that the building up of the bottom has become objectionable, we first charge four ladles of converter metal of 0.06 per cent. carbon, averaging about 45,000 pounds each. After completing this metal charge of four ladles we add the necessary quantity of lime and then iron oxid. We then heat the bath until we find the slag in proper condition, usually one and a half to two hours, and then add a fifth ladle of high carbon blown metal, the carbon about 2.50 to 3.00 per cent. The finishing steps are then carried out as described in connection with the first operation. By this method of charging we have discovered that the bottom instead of building up is slightly eroded; so much so, in fact, that we are enabled by charging the furnace one way or the other, depending upon the condition of the bottom, to maintain a practically uniform bottom.

In the above example we have described the adding of the slag materials in solid condition and the adding of the metal while the slag materials are still solid. We may, however, melt the slag before introducing it, or after introducing it into the open hearth furnace we may melt it there before adding blown metal. And the term "slag" is used herein to cover either the solid materials or the molten slag. This application is intended to include both methods; a separate divisional application (No. 178,931) being filed herewith to cover specifically the adding of the metal to molten slag. Various other modifications may be made in the several steps of the process and in the order of such steps and the specific compositions of the charge by those skilled in the art without departing from the invention as defined in the following claims. And either of the operations above described may be alternated with some building up or eroding operation (as the case may require) other than that herein described.

What we claim is:

1. In the manufacture of basic open hearth steel from all-blown metal, the method which comprises the following two alternating operations: (1) charging the furnace first with lime and iron oxid and then with low carbon molten blown metal, heating until the bath and the slag are in proper condition and then adding high carbon molten blown metal and finishing the operation and pouring the charge; and (2) charging the open hearth furnace first with low carbon molten blown metal and then with lime and iron oxid, heating until the bath and slag are in proper condition and then adding high carbon molten blown metal and finishing the operation and pouring the charge; so that the first operation will serve to build up the bottom of the furnace and the second to erode it and the alternating operations will maintain it approximately uniform.

2. In the manufacture of basic open hearth steel from all blown metal, the method which comprises the following two alternating operations: (1) charging the open hearth furnace first with lime and iron oxid and then with about four parts of molten converter metal blown down to about 0.06 per cent. carbon, heating until the bath and the slag are in proper condition and then adding about one part of molten converter metal blown to about 2.50 to 3.00 per cent. carbon and finishing the operation and pouring the charge; and (2) charging the open hearth furnace first with about four parts of molten converter metal blown to about 0.06 per cent. carbon and then with lime and iron oxid, heating until the bath and slag are in proper condition and then adding about one part of molten converter metal blown to about 2.50 to 3.00 per cent. carbon and finishing the operation and pouring the charge; so that the first operation will serve to build up the bottom of the furnace and the second to erode it and the alternating operations will maintain it approximately uniform.

3. In the manufacture of basic open hearth steel from all blown metal, the method which comprises charging the open hearth furnace first with lime and iron oxid and then with molten blown metal low in carbon, heating until the bath and the slag are in proper condition and then adding high carbon molten blown metal and finishing the operation.

4. In the manufacture of basic open hearth steel from all blown metal, the method which comprises charging the open hearth furnace first with lime and iron oxid and then with about four parts of molten converter metal blown to about 0.06 per cent. carbon, heating until the bath and the slag are in proper condition and then adding about one part of molten converter metal blown to about 2.50 to 3.00 per cent. carbon and finishing the operation.

5. In the manufacture of basic open hearth steel from all blown metal, the method which comprises charging the open hearth furnace first with low carbon molten blown metal and then with lime and iron oxid, heating until the bath and slag are in proper condition and then adding high carbon molten blown metal and finishing the operation.

6. In the manufacture of basic open hearth steel from all blown metal, the method which comprises charging the open hearth furnace first with about four parts of molten converter metal blown to about 0.06 per cent. carbon and then with slag, heating until the bath and slag are in proper condition and then adding about one part of molten converter metal blown to about 2.50 to 3.00 per cent. carbon and finishing the operation.

7. In the manufacture of basic open hearth steel, the method which comprises two operations, one serving to build up the bottom of the furnace and the other to erode it, alternating these operations as required to maintain an approximately uniform bottom.

In witness whereof, we have hereunto signed our names.

HERBERT C. RYDING.
ANSON W. ALLEN.